United States Patent [19]

Rose

[11] 4,343,822
[45] * Aug. 10, 1982

[54] PROCESS FOR PREPARING COOKED MEAT PRODUCTS HAVING REDUCED SHRINKAGE AFTER REFRIGERATION

[76] Inventor: Peter W. Rose, R.R. 3 Covered Bridge Rd., South Barrington, Ill. 60010

[*] Notice: The portion of the term of this patent subsequent to Apr. 28, 1998, has been disclaimed.

[21] Appl. No.: 245,636

[22] Filed: Mar. 19, 1981

Related U.S. Application Data

[63] Continuation-in-part of Ser. No. 182,329, Aug. 28, 1980, which is a continuation-in-part of Ser. No. 165,850, Jul. 7, 1980, Pat. No. 4,276,313, which is a continuation-in-part of Ser. No. 139,795, Apr. 14, 1980, Pat. No. 4,264,632, which is a continuation-in-part of Ser. No. 129,727, Mar. 12, 1980, Pat. No. 4,264,631.

[51] Int. Cl.$^3$ .............................. A23B 4/02; A23L 3/32
[52] U.S. Cl. ..................................... 426/247; 204/131; 426/244; 426/246; 426/264; 426/524; 426/641; 426/652
[58] Field of Search ............... 426/129, 237, 244, 246, 426/247, 264, 281, 282, 284, 641, 646, 649, 652, 413, 518, 519, 524; 204/98, 131

[56] References Cited

U.S. PATENT DOCUMENTS

| | | |
|---|---|---|
| 267,684 | 11/1882 | Fowler ............................. 426/246 |
| 657,258 | 9/1900 | Washburn ......................... 426/246 |
| 705,367 | 7/1902 | Lincoln ......................... 426/246 X |
| 760,173 | 5/1904 | Ball ................................. 426/246 |
| 930,772 | 8/1909 | Lincoln ............................ 426/246 |
| 1,044,201 | 11/1912 | Lincoln ............................ 426/237 |

*Primary Examiner*—Arthur L. Corbin
*Attorney, Agent, or Firm*—Dressler, Goldsmith, Shore, Sutker & Milnamow, Ltd.

[57] ABSTRACT

A cooked meat product having reduced shrinkage after refrigeration is prepared by treating hot meat with an aqueous solution of an edible chloride salt present at at least about 0.5 weight percent. The solution is first electrolyzed by passage of a direct current through it to prepare an electrolyzed moisturizing solution having moisturizing activity. The electrolyzed moisturizing solution is cooled to a temperature of no higher than about 30° F., while maintaining its moisturizing activity, to form an electrolyzed moisturizing composition. The electrolyzed moisturizing composition and hot meat are thereafter combined and maintained in contact until the external meat temperature is lowered to about 70°–110° F. to form externally cooled meat which is refrigerated and then recovered.

27 Claims, No Drawings

Page 1

PROCESS FOR PREPARING COOKED MEAT PRODUCTS HAVING REDUCED SHRINKAGE AFTER REFRIGERATION

CROSS-REFERENCE TO RELATED APPLICATIONS

This is a continuation-in-part of copending patent application Ser. No. 182,329, filed on Aug. 28, 1980, which is a continuation-in-part of copending application Ser. No. 165,850, filed on July 7, 1980, now U.S. Pat. No. 4,276,313 which is a continuation-in-part of copending patent application Ser. No. 139,795, filed on Apr. 14, 1980, now U.S. Pat. No. 4,264,632, which in turn, is a continuation-in-part of copending patent application Ser. No. 129,727, filed on Mar. 12, 1980, now U.S. Pat. No. 4,264,631.

TECHNICAL FIELD

The present invention relates to a process for preparing cooked meat food products having reduced shrinkage upon processing, particularly after refrigeration, which utilizes a cooled electrolyzed moisturizing composition to reduce meat shrinkage.

BACKGROUND ART

Water constitutes the largest portion, by weight, of a food animal. From about the time such an animal is slaughtered, its carcass begins to lose water, dry out or shrink. Shrinkage or weight loss, which begins on slaughtering, continues not only through the refrigeration and butchering steps in meat processing, but also during cooking, such as smoking, as well as while the smoked, hot meat is refrigerated thereafter. As a result of shrinkage, the meat prior to cooking generally becomes somewhat tougher and can be harder to butcher. As a further result of this shrinkage, the meat provider obtains a smaller amount of product to sell, and that product is of diminished quality. Because of shrinkage, the meat purchaser receives a smaller amount of product to cook. Cooking also results in shrinkage, and subsequent refrigeration after cooking of precooked products results in a still smaller amount of cooked material served for ultimate consumption.

Several processes are known in the art which are said to minimize or reverse shrinkage, at both the carcass and cooked meat stages. Among these are processes in which carcasses are sprayed or fogged with an aqueous solution, or in which a carcass is dipped into a water bath. In addition, it is well known to use aqueous curing compositions or pickles which assist in reducing meat shrinkage while preserving and flavoring the meat.

Hot cooked meat has been sprayed with cold water and aqueous brine solutions prior to refrigeration to cool the hot product and minimize refrigeration load, and to also try to minimize subsequent refrigeration shrinkage. While these sprayings are convenient to perform, cool the hot product, and reduce shrinkage during refrigeration to some extent, their cost in money and time has generally been found to be too excessive for widespread use.

For example, in one process, brine having a sodium chloride content of about 10-15 percent is cooled to about 20° F. and then sprayed onto the smoked meat. Here, the excessive cost stems from the increased refrigeration load required to cool the brine to 20° F., and from the loss of the refrigerated brine solution itself which is not recycled. In another process, smoked meat is showered with tap water for a three hour period entailing the use of about 3500 gallons of non-reusable water per smokehouse load.

Additionally, such spraying tends to reduce the meat's color which is normally dark red for cooked, cured products and also reduces the desirable smoked meat aroma. It would also therefore be beneficial if hot, cooked or smoked meat could be conveniently and inexpensively sprayed without loss of aroma or meat color.

SUMMARY OF THE INVENTION

The present invention provides a process for the preparation of a cooked meat food product with reduced shrinkage after refrigeration. By reduced shrinkage, it is meant that the meat loses a smaller amount of weight between the time it is cooked and it has been refrigerated to a predetermined internal temperature, such as about 45° F.

The meat treating process comprises the steps of providing hot meat, such as that having an internal temperature of at least about 130° F., and contacting the meat with a specially treated aqueous solution containing an edible chloride salt present at a concentration of at least about 0.5 percent by weight. Before the aqueous solution is contacted with the meat, direct electric current is passed through the aqueous solution at about 2 to about 20 amperes to prepare an electrolyzed moisturizing solution having moisturizing activity. The electrolyzed moisturizing solution is then cooled to a temperature of no more than about 30° F., and preferably frozen solid, while the solution maintains moisturizing activity, to form a moisturizing composition.

Thereafter, the moisturizing composition is combined with the meat to form an admixture, while the moisturizing activity is maintained. In preferred practice, the admixture is formed with the moisturizing composition (a) in solid form; (b) as a slurry or slush of solid and liquid; or (c) after the solid portion has melted into a liquid. Additional, non-electrolyzed solution can also be combined with the moisturizing composition, and thus with the meat.

Contact between the hot meat supply and moisturizing composition is maintained for a time period sufficient to lower the external temperature of the hot meat to from about 70° F. to about 110° F., and form externally cooled meat. The externally cooled meat is then refrigerated, and recovered for further use.

In my aforementioned patents, all of whose pertinent disclosures are hereby incorporated by reference, it is disclosed that a chloride salt solution, once electrolyzed, could not be stored for hours, let alone days or longer, nor could it be efficiently shipped, as its effectiveness would deteriorate with time. It has more recently been found, as disclosed in my copending patent application Ser. No. 182,329, that if the electrolyzed solution is cooled to a temperature of no more than about 30° F. after the cessation of direct current passage therethrough, the solution's moisturizing activity can be maintained for a longer period of time than was heretofore thought possible.

For example, if the cooled moisturizing composition is frozen into a composition containing at least some solid, and preferably completely frozen into a solid, this frozen moisturizing composition will hold its effectiveness for weeks or months or possibly longer. A thawed, previously frozen composition, has been found to maintain its moisturizing activity for several days when held at temperatures below about 40° F. Thus, preparation and storage for later use of relatively large quantities of moisturizing composition are now possible, as is shipment of the frozen moisturizing composition from one part of the country for use in another.

Several advantages of the use of electrolyzed solutions for reducing shrinkage in meat products are discussed in my aforementioned patents, and particularly in application Ser. No. 165,850, filed on July 7, 1980, now U.S. Pat. No. 4,276,313 and will therefore not be dealt with further herein.

There are several additional benefits and advantages to treating hot, cooked or smoked meats as is described in the process of this invention.

One of these advantages is that the amount of shrinkage is reduced between the weight of hot, cooked or smoked meat as it emerges from the cook house, and the same meat as it later emerges from a refrigerator when compared with shrinkage measured between the same stages of production when the process of this invention is not used.

Another advantage of the process of this invention is that hot, cooked or smoked meat which is sprayed with an electrolyzed moisturizing composition tends not to lose its dark red color as is usually found with conventional spraying processes.

Another benefit of the process of this invention is that hot, smoked meat treated according to the disclosed process tends not to lose its smoked flavor and aroma.

Still another advantage of the instant invention is that cooked or smoked meats are plumper after refrigeration than are similar meats which are sprayed directly after cooking or smoking with cold tap water, and these plumper cooked meats tend not to exhibit the wrinkles which are characteristic of products prepared by procedures which were heretofore known.

Still other benefits and advantages will be apparent to those skilled in the art from the disclosure which follows.

DETAILED DESCRIPTION OF THE INVENTION

When practicing the present invention, the reduction in meat shrinkage is manifest in all three dimensions of the meat subjected to treatment. As a consequence, the meat tends to retain its size and shape during and after refrigeration.

It is emphasized that contrary to some prior practices of others, the meat treated herein is not in electrical contact with the aqueous solutions while there is passage of an electrical current through those solutions.

The process of this invention is useful for meat products which are fully cooked as well as for those products which are only partially cooked, and intended to be cooked further by the consumer. The terms "cooked" or "smoked" are used herein synonymously and refer both to those products which are fully cooked as well as to those which are only partially cooked. A fully cooked, ready to eat, product typically emerges from the cook or smokehouse with an internal temperature in excess of about 148° F. A partially cooked meat, which requires additional cooking, typically has an internal temperature in excess of about 142° F. after smoking, while a product such as bacon which requires full, subsequent cooking, emerges from the smokehouse with an internal temperature of about 130° F, or more. Internal temperatures are conveniently determined with a standard meat thermometer.

The process of this invention can be practiced with the meat from a wide variety of animals. As used herein, the term "meat" includes the flesh of domestic and wild mammals, such as beef, pork, veal, venison, buffalo, and the like. In preferred practice, this flesh is pork or beef.

Pork will be used illustratively herein as it is a meat of great commercial importance. In addition, pork is also a useful exemplary meat inasmuch as pork products are sold both fully and partially cooked.

An aqueous solution of an edible chloride salt such as sodium chloride, potassium chloride or calcium chloride is utilized in the present process. Sodium chloride is the preferred salt.

This aqueous solution contains a concentration of at least about 0.5 weight percent edible chloride salt, and solutions having increased chloride salt concentrations, up to and including saturated solutions of the edible chloride salt can be used. As the aqueous solutions used herein are frozen in preferred practice, and increasing solute concentrations decrease the freezing point, requiring a greater refrigeration cost, it is understood that solutions having concentrations substantially less than saturation are preferred. The concentration of edible chloride salt in composition used to contact the meat, while being at least about 0.5 weight percent, is preferably about 0.75 to about 1.25 percent by weight.

A direct current of about 2 to about 20 amperes is suitably passed through the aqueous, edible chloride salt solution to prepare an electrolyzed moisturizing solution having moisturizing activity (discussed hereinafter). Preferably, a current of about 5 to about 15 amperes is used, and more preferably, this current is about 5 to about 10 amperes. The voltage during electrolysis is found to vary, and can be about 1 to about 20 volts, and preferably is less than about 5 volts.

The electrolyzed moisturizing solution is then cooled to a temperature of no more than about 30° F. after the passage of the direct electric current has ceased, while maintaining the moisturizing activity, to form a moisturizing composition. In usual practice, the cooling is accomplished within about 40 minutes of the cessation of current passage, and this cooling is the initial phase of the freezing of the electrolyzed moisturizing composition discussed hereinbelow. However, the electrolyzed moisturizing composition need not be frozen, and so long as the electrolyzed moisturizing solution is cooled as above, it can be frozen at a later time, or used in its cooled state so long as its moisturizing activity is maintained. In preferred practice, the electrolyzed moisturizing solution is cooled as rapidly as possible to minimize any deterioration which might occur.

The electrolyzed moisturizing composition is preferably frozen after cooling to form a moisturizing composition which is at least partially solid. The moisturizing composition can be totally solid or can have both solid and liquid phases present. In more preferred practice, the electrolyzed moisturizing solution is frozen to form a totally solid moisturizing composition. While several means are known in the art for freezing, a blast freezer operating at a temperature of about −20° F., and whose air movement is about 10,000–15,000 cubic feet per minute (c.f.m.), has been found particularly useful.

After formation of a moisturizing composition, such as that which is at least partially solid, that composition is combined with the meat to contact one with the other. While not wishing to be bound by any one theory or hypothesis, it is believed that the shrink reduction, with maintenance of color and aroma observed in the process of this invention are a result, at least in part, of the hot meat sorbing, or taking up, and retaining the aqueous compositons which are combined and contacted therewith. The exact mode of this take-up or sorption is not understood, nor is it understood why the electrolyzed compositions useful herein perform this function when used in a lesser amount or at a higher temperature than similar, non-electrolyzed solutions or compositions, or other compositions, such as solutions of tap water. It is also not understood why color and aroma are maintained to a greater extent with the process of this invention than with previously used processes.

The modes in which the meat and electrolyzed moisturizing composition are contacted and the physical form of the electrolyzed moisturizing composition at the time of initial contact can each be quite varied. As will be seen from the discussion hereinbelow, some of the modes of contacting and some physical forms of the electrolyzed moisturizing composition may not be compatible.

At the time of the initial combining and contacting of the meat and moisturizing composition, that composition is: (a) a frozen solid, or (b) a slurry or slush of frozen solid and liquid, or (c) a liquid formed from the melting of the slurry or solid. Regardless of the form of the electrolyzed moisturizing composition, it is utilized while maintaining moisturizing activity.

The electrolyzed moisturizing composition is suitably at a lower temperature than the meat with which it is contacted as one function of the combining and contacting step of this process is to lower the surface temperature of the hot meat prior to its entry into the refrigerator. It has been found preferable to combine and contact the hot meat with an electrolyzed moisturizing composition having a temperature of between about 30° and about 40° F., a temperature of between about 32° to 37° F. being more preferable.

The use of melted, electrolyzed moisturizing composition is preferred and is useful when hot, cooked meat is sprayed with the electrolyzed moisturizing composition. In still more preferred practice, frozen, solid, electrolyzed moisturizing composition is allowed to melt in the presence of a non-electrolyzed aqueous solution and the admixture so produced is sprayed onto the hot, cooked meat. The difficulties of spraying the electrolyzed moisturizing composition in a solid form are readily apparent. However, some solid particles may be present in an electrolyzed moisturizing composition which is to be sprayed onto the meat, so long as they are of small enough dimension not to clog the spray system.

Combining and contacting of the hot meat with the electrolyzed moisturizing composition can be accomplished by admixture and agitation of the meat with solid, particulate moisturizing composition, or by bathing the hot meat passively or with agitation in a melted or slurry form of the moisturizing composition. The meat can also be dipped into or splashed with the moisturizing composition when the composition is in a melted or slurry form. However, as pointed out before, the combining and contacting step of the process of this invention is preferably accomplished by spraying the hot meat with the composition.

Illustratively, for a commercial operation wherein hundreds or thousands of pounds of meat are smoked at one time, a plurality of individual cuts of meat are placed on a rack which moves through the smokehouse; sufficient space being left between the meat pieces to allow for proper smoking. Upon removal from the smokehouse, the hot racks containing the hot meat are sprayed with the electrolyzed moisturizing composition until the desired, external surface temperature is achieved.

With hand held equipment, spray rates of about 2 to about 5 gallons per minute have been found to be effective. It is to be noted that each cut or piece of meat need not be continuously sprayed during the spray process, because such a continous spray is wasteful of the electrolyzed moisturizing composition and since the heat capacity of the aqueous composition prevents its losing its relatively cold temperature too rapidly. Spraying of the individual meat cuts is preferably intermittently done at approximately 2 to about 5 minute intervals, as such spraying at the above spray rates usually provides the desired external surface temperature within about 5 minutes from exit of the meat from the smokehouse, and prior to subsequent refrigeration of the meat. Usually, two spraying treatments, one upon exit from the smokehouse and another spraying about 2-4 minutes later are sufficient for a pork butt. A larger piece of meat, such as a ham, typically requires three or more spraying treatments, while one spray application is often sufficient for narrow diameter smoked meat products, such as sausages.

Regardless of the specific manner in which it is carried out, contact between the meat and the electrolyzed moisturizing composition is maintained for a time sufficient to lower the surface temperature of the hot meat to a range of about 70° F. to about 110° F., to form externally cooled meat. While the electrolyzed moisturizing composition cools the external surface of the meat, the internal temperature of the externally cooled meat preferably remains substantially at the same temperature it had upon exit from the cooking house; i.e., within about 5° to about 10° F. of the smokehouse exit temperature.

After cooling, the meat to a surface temperature of about 70°-110° F., the meat is refrigerated as is desired. In preferred practice, refrigeration is carried out until an internal meat temperature of about 45° F. is achieved. The refrigerated meat is thereafter recovered and packaged for sale.

In typical industry practice, a weight difference of about 4 percent is usually noted between the hot, cooked or smoked meat and the suitably refrigerated meat, such as that refrigerated to an internal temperature of about 45° F. Using the process of this invention, weight differences of only about 1 percent are typical between hot and refrigerated meat, although occasionally higher values are obtained.

Aside from the decreases in weight shrinkage obtained from the use of the process of this invention, the refrigerated products are also more plump than are similar products produced by prior processes. One tangible result of this increased plumpness is that the plastic bags normally used for subsequent vacuum packaging and cryogenic freezing of refrigerated pork butts had to be replaced with bags about one-half inch larger in diameter to facilitate ease of packaging of the smoked pork butts made in accordance with this invention.

Another result of the increased plumpness of the products prepared using this invention is that the wrinkles and creases normally associated with the refrigerated meats are substantially absent. For example, pork butts are often smoked, refrigerated and sold within a fibrous casing, which shrinks around the meat during cooking and refrigeration. During this shrinking process, the casing typically wrinkles and fills some of the voids created when the meat loses the usual 4 percent of its weight from leaving the smokehouse through the refrigeration step. On the other hand, smoked, fibrous casing covered pork butts prepared according to the process of this invention exhibit substantially no casing wrinkles after refrigeration is complete.

Cooked meats also typically exude a liquid composed of water, fat and protein which drips to the floor of the refrigerator. This liquid accounts for most of the weight lost during refrigeration and represents a loss of an otherwise salable product which is not sold; it can also create a sanitation problem on the refrigerator floor. Using the process of this invention, substantially no exudate is observed on the refrigerator floor, nor is protein found in the liquid dripping from hot meat which is contacted with the electrolyzed moisturizing composition.

It is noted that the electrolyzed moisturizing composition need not supply all of the water or edible chloride salt used in the process of this invention. Thus, it is found that the electrolyzed moisturizing composition may contribute only a portion, e.g. about 25-33 weight percent, of the weight of composition used for combining with and contacting the hot meat, while the remaining about 75-67 weight percent of that composition is provided by admixture of an additional aqueous solution such as deionized or tap water, an aqueous solution of an edible chloride salt or the like, so long as the total admixture used for combining and contacting the meat meets the minimum chloride salt concentration and moisturizing activity criteria, discussed hereinafter, at the time of contacting the meat.

When an aqueous edible chloride salt solution is prepared for subsequent dilution as discussed hereinabove, an amount of chloride salt in excess of 0.5 weight percent is dissolved in that solution so that the electrolyzed moisturizing composition used to combine with and contact the meat contains at least about 0.5 weight percent of the chloride salt from the aqueous edible chloride salt solution. When the electrolyzed moisturizing solution comprises only about 25-33 percent of the electrolyzed moisturizing composition used to contact the hot meat, the concentration of edible chloride salt in that electrolyzed moisturizing solution, and the aqueous edible chloride salt solution from which it is made, is preferably about 3 to about 4 weight percent.

A small amount of a sugar, such as sucrose, or other flavorant can also be present in the aqueous solution at a concentration sufficient to mask the flavor of the edible chloride salt. A useful amount of sucrose for this purpose has been found to be about 15 percent by weight of the edible chloride salt used to contact the meat.

As stated hereinbefore, the direct current is passed through the solution to prepare an electrolyzed moisturizing solution having moisturizing activity. Criteria which have been found useful for determining the duration of direct current passage through the aqueous solution to form the electrolyzed moisturizing solution having moisturizing activity include those which are based upon measurements which can be easily made, e.g., the number of coulombs which have passed through the aqueous solution, and the change in pH value of certain aqueous solutions upon electrolysis.

Use of the coulombic criterion for the preparation of an electrolyzed moisturizing solution is based upon the passage of a direct current of about 2 to about 20 amperes for a period of time sufficient to pass therethrough at least about 25 coulombs per liter of solution, and preferably at least about 50 coulombs per liter of solution. Usually about 300 coulombs per liter of aqueous sodium chloride solution represents a practical upper limit inasmuch as additional current passage confers little, if any, further benefit.

When there is substantially no buffering capacity in the aqueous edible chloride salt solution, as in a solution of tap water saturated with sodium chloride, another criterion for the duration direct electric current passage may be used. By this criterion, direct electric current is passed through the aqueous solution until the pH of the resulting electrolyzed moisturizing solution has at least a value of about 8. In more preferred practice, passage of the direct current (electrolysis) is continued until a pH value of about 8.5 to about 10.5 is achieved for the resulting electrolyzed moisturizing solution.

An aqueous solution of edible chloride salt normally has a near neutral pH value. For example, the aqueous sodium chloride solution may have a pH value of about 6.5 to about 7.7, prior to the passage of current therethrough when prepared from City of Chicago tap water.

The rise in pH value and moisturizing activity of the electrolyzed moisturizing solution is only temporary, and the electrolyzed moisturizing solution should be used while the pH value thereof remains elevated. For example, for a City of Chicago tap water solution containing about 3.8 percent by weight sodium chloride, the pH value begins to fall back towards its original value about 15 minutes after the direct current passing therethrough is shut off. This solution reverts to near its original pH value after about 40 minutes from the time the direct current is shut off at which time its moisturizing activity is also substantially lost. Use of deionized, distilled or deionized-distilled water allows maintenance of an elevated pH value and moisturizing activity for a somewhat longer period of time.

When the electrolyzed moisturizing solution comprises only a portion of the total composition used for contacting the meat, the above moisturizing activity criteria also apply. Thus, the direct current is passed through the aqueous solution of edible chloride salt so that when the electrolyzed solution is combined with another non-electrolyzed aqueous solution to form a resulting electrolyzed moisturizing solution, an average of at least about 25 coulombs per liter would have passed through the resulting electrolyzed solution. For example, if 100 coulombs of direct current were passed through one liter of aqueous edible chloride salt solution, and that electrolyzed solution were mixed with three liters of a non-electrolyzed solution, 100 coulombs of direct current would have passed through the resulting four liters, or an average of about 25 coulombs of direct current per liter would have passed.

When using the pH value of the electrolyzed solution as a criterion, the pH value of the resulting electrolyzed moisturizing solution should be at least about 8. For example, the aqueous edible salt solution may be electrolyzed to a first pH value, and a second aqueous solution mixed therewith so that the resulting electrolyzed solution has a pH value of at least about 8. A direct correlation for all water supplies is not possible for determining to what pH value the electrolyzed solution should be elevated prior to adding the second solution. However, that value may be readily obtained for a given water supply by a few simple experiments.

Cooling of the electrolyzed moisturizing solution to form the before described moisturizing composition helps to maintain the elevated pH value, and effectiveness of the composition. The electrolyzed moisturizing composition (cooled electrolyzed moisturizing solution) is then contacted with the hot meat while maintaining its moisturizing activity. For example, using the pH value criterion, the meat is contacted with the electrolyzed moisturizing composition having a pH value of at least about 8.

When a solid moisturizing composition is utilized, its pH value is measured by allowing a portion to melt, and measuring the pH value of the melted composition. Measurement of pH values for the slurry or slush, or completely melted moisturizing composition may be made in the usual manner.

As stated hereinbefore, the electrolyzed moisturizing composition need not comprise all of the water and edible chloride used to combine and contact the meat in the process of this invention. When a non-electrolyzed aqueous solution, such as deionized or tap water, is admixed with the electrolyzed moisturizing composition to form a moisturizing composition admixture, and that admixture is used to contact the meat, the admixture should meet the above-described criteria for the electrolyzed moisturizing composition.

Electrodes for use in the present process can be selected from a wide variety of conductive materials such as carbon, graphite, silver, stainless steel, or the like. In one suitable arrangement, a stainless steel pan containing the edible chloride salt solution can be used as the anode while a carbon electrode suspended within the solution in the pan can be the cathode; alternatively the pan can be made the cathode and the carbon electrode the anode. It is also preferred that the electrodes be relatively inert during electrolysis, and be relatively non-consumable.

The word "sorb" as used herein in its various grammatical forms is meant to include both the terms "absorb" and "adsorb." The words "take-up" and "sorb" of the electrolyzed moisturizing composition are all used herein to describe the same phenomenon.

The term "solution" is used herein to include true solutions, dispersions and mixtures of ingredients as are known in the art and to be useful for treating meats.

The examples set forth hereinbelow further illustrate the present invention.

BEST MODE FOR CARRYING OUT THE INVENTION

Example 1

Smokehouse-Refrigeration Shrinkages

Shrinkage determinations for several days' production of three smoked pork products were made by comparing the hot weights of the meat as it left the smokehouse, to the weight of the same meat after refrigeration to an internal temperature of 45° F., and prior to packaging for sale. These shrink data are shown in Tables 1 and 2 below.

The data of Table 1 are reported using the preferred spray process of this invention, while the data of Table 2 are reported for products which were smoked and then removed to the refrigerator. The observed shrinkage for each particular product is reported for the period of the determination, as is an average shrink result obtained from several similar determinations made over a longer time period for that particular product type and process.

The products whose shrinks were determined were:
(1) pork butts which were stuffed into a fibrous casing, cooked to an internal temperature of 142° F. and termed casing pork butt;
(2) pork butts stuffed into a polyester net, cooked to an internal temperature of 142° F. and termed netted pork butt; and
(3) water added, 14–17 pound bone-in-hams, cooked to an internal temperature of 148° F. and also stuffed in polyester net.

The polyester nets were removed from those products cooked in them prior to cold weighing and while the fibrous casing was left around the product at packaging.

To prepare the electrolyzed moisturizing composition used to spray the meat of Table 1, several batches of aqueous solution prepared from 30 pounds of deionized water, one pound of sodium chloride and 72 grams of sucrose were electrolyzed using a current of 4.5 amperes at 3 volts for 5 minutes (110 coulombs/liter of solution). The pH of the solution rose from 7.5 to 10.5 at the completion of the electrolysis. The electrolyzed moisturizing solution batches were then quickly poured into plastic liners, placed in boxes and frozen into blocks in a blast freezer at a temperature of −20° F. and whose air movement was about 10,000 c.f.m.

A number of the frozen blocks were placed in a 500 gallon holding tank and the tank filled with tap water. The weight ratio of frozen electrolyzed moisturizing composition blocks to water was about 1:2. Upon mixing, the temperature of the admixture was 35°–37° F. The admixture was then fed into an 84 gallon vessel filled with flakes prepared from similarly made frozen blocks and having a size of about one inch in the largest dimension, and further mixed with the frozen flakes. The resulting composition was thereafter pumped from the 84 gallon vessel and sprayed upon racks of hot, weighed meat as they emerged from the smokehouse; each piece of meat being sprayed first upon exit from the smokehouse, and then about 2 minutes thereafter using a spray rate of about 2 gallons per minute until the surface temperature of the meat was about 100° F. The sodium chloride content of the moisturizing composition sprayed on the meat ranged from about 0.25 to about 1 percent by weight. The externally cooled meat was thereafter taken from the smokehouse racks and transported to the refrigerator and remained therein until an internal meat temperature of 45° F. was obtained.

Using the process of this invention, a refrigeration time of about 5–7 hours was typically required to reach the desired internal temperature. A refrigeration time of about 8–10 hours was typically required to cool the products of Table 2 to an internal temperature of 45° F.

TABLE 1

| | Shrinkage Using The Spray Process (weight in pounds) | | |
|---|---|---|---|
| | Casing Pork Butts | Netted Pork Butts | Bone-in-Hams |
| Smoked weight | 131,107 | 175,929 | 138,168 |
| Packed weight | 128,715 | 173,235 | 135,957 |
| Observed percent shrink | 3.5 | 1.6 | 1.6 |

TABLE 1-continued

| | Shrinkage Using The Spray Process (weight in pounds) | | |
|---|---|---|---|
| | Casing Pork Butts | Netted Pork Butts | Bone-in-Hams |
| Average percent shrink | 1.5 | 1 | 1.75 |

TABLE 2

| | Shrinkage Without The Spray Process (weight in pounds) | | |
|---|---|---|---|
| | Casing Pork Butts | Netted Pork Butts | Bone-in-Hams |
| Smoked weight | 226,760 | 177,979 | 145,360 |
| Packed weight | 218,850 | 168,250 | 137,916 |
| Observed Percent shrink | 3.5 | 5.5 | 5.1 |
| Average percent shrink | 4 | 5 | 5 |

As can be seen from the data in the above Tables, the shrinkage observed using the process of this invention was generally less than that observed when the usual process was carried out. The differences between the two processes is further highlighted by the differences in average percent shrinks found for several determinations of the same product type.

The color products produced using the spray process of this invention was generally similar to that of the products which had not been sprayed. The smoked aroma for products produced by both processes was also similar. These color and aroma results are contrary to the results found when aqueous brine solutions had been sprayed upon similar smoked products at an earlier date, as are the improved shrinkage values.

The present invention is defined by the claims which follow.

What is claimed is:

1. A process for preparing a cooked meat product having reduced shrinkage after refrigeration comprising the steps of:
   providing hot meat;
   providing an aqueous solution containing an edible chloride salt present at a concentration of at least about 0.5 percent by weight;
   passing a direct electric current through said aqueous solution to form an electrolyzed moisturizing solution having moisturizing activity, said current passing therethrough at about 2 to about 20 amperes;
   cooling said electrolyzed moisturizing solution to a temperature of no higher than about 30° F., after passage of said direct electric current through said electrolyzed moisturizing solution has ceased, while maintaining said moisturizing activity, to form an electrolyzed moisturizing composition;
   combining said hot meat and said electrolyzed moisturizing composition to contact said meat with said electrolyzed moisturizing composition, while maintaining said moisturizing activity, to form an admixture;
   maintaining said contact for a time period sufficient to lower the external meat temperature of said hot meat to about 70°–110° F. to form externally cooled meat;
   thereafter refrigerating said externally cooled meat; and
   recovering said refrigerated meat.

2. The process according to claim 1 wherein said meat is in the form of individual cuts of meat.

3. The process according to claim 1 wherein said electrolyzed moisturizing composition is:
   (a) solid; or
   (b) a slurry of solid and liquid; or
   (c) a liquid formed from the melting of said electrolyzed moisturizing compositions of (a) or (b).

4. The process according to claim 1 wherein said direct electric current is passed through said solution until at least about 25 coulombs have passed therethrough per liter of said aqueous solution.

5. The process according to claim 1 wherein said aqueous solution has a buffering capacity substantially that of tap water saturated with sodium chloride.

6. The process according to claim 5 wherein said direct electric current is passed through said aqueous solution for a time sufficient to raise the pH value of said aqueous solution to at least about 8 while forming said electrolyzed moisturizing solution.

7. The process according to claim 6 wherein said meat and electrolyzed moisturizing composition are combined while the pH value of said electrolyzed moisturizing composition is at least about 8.

8. The process according to claim 1 wherein said edible chloride salt is sodium chloride and is present in a concentration of about 0.75 to about 1.25 percent by weight.

9. The process according to claim 1 wherein an additional amount of a non-electrolyzed aqueous composition is added to the meat in said combining step.

10. The process according to claim 1 wherein said meat is the flesh of mammals.

11. The process according to claim 10 wherein said meat is pork.

12. The process according to claim 10 wherein said meat is beef.

13. A process for preparing a cooked meat product having reduced shrinkage after refrigeration comprising the steps of:
   providing hot meat having an internal temperature of at least about 130° F.;
   providing an aqueous solution containing sodium chloride present at a concentration of at least about 0.5 percent by weight;
   passing a direct electric current of about 2 to about 20 amperes through said aqueous solution for a time sufficient to raise the pH value of said aqueous solution to at least about 8 to thereby form an electrolyzed moisturizing solution;
   cooling said electrolyzed moisturizing solution to a temperature of higher than about 30° F., after passage of said direct electric current has ceased, while said solution has a pH value of at least about 8, to form an electrolyzed moisturizing composition;
   combining said hot meat and said electrolyzed moisturizing composition to contact said hot meat with said electrolyzed moisturizing composition while the pH value of said electrolyzed moisturizing composition is at least about 8;
   maintaining said contact for a time period sufficient to lower the external temperature of said hot meat to about 70°–110° F. to form externally cooled meat;
   thereafter refrigerating said externally cooled meat; and
   recovering said refrigerated meat.

14. The process according to claim 13 wherein said edible chloride salt is present in said aqueous solution at a concentration of about 0.75 to about 1.25 percent by weight.

15. The process according to claim 13 wherein said direct electric current is passed through said aqueous solution at about 5 to about 15 amperes.

16. The process according to claim 13 wherein said direct current is passed through said aqueous solution until the pH value of said electrolyzed moisturizing solution is about 8.5 to about 10.5.

17. The process according to claim 13 wherein said electrolyzed moisturizing composition is cooled to a frozen solid and thereafter melted, and the liquid formed from the melting of said frozen electrolyzed moisturizing composition is used to contact said hot meat.

18. The process according to claim 17 wherein said melted liquid is admixed with a non-electrolyzed aqueous solution to form an admixture having an edible chloride salt content, from said electrolyzed moisturizing composition, of at least 0.5 percent by weight.

19. The process according to claim 13 wherein said electrolyzed moisturizing composition is contacted with said meat by spraying said electrolyzed moisturizing composition onto said meat.

20. A process for preparing a cooked meat product having reduced shrinkage after refrigeration comprising the steps of:
   providing meat having an internal temperature of at least about 130° F.;
   providing an aqueous solution containing sodium chloride present at a concentration of at least about 0.5 percent by weight;
   passing a direct electric current of about 2 to about 20 amperes through said solution for a time period sufficient to pass at least about 25 coulombs per liter of said aqueous solution therethrough to produce an electrolyzed moisturizing solution having moisturizing activity;
   cooling said electrolyzed moisturizing solution to a temperature of no higher than about 30° F., after passage of said direct electric current has ceased, while maintaining said moisturizing activity, to form an electrolyzed moisturizing composition;
   combining said hot meat and said electrolyzed moisturizing composition to contact said hot meat with said electrolyzed moisturizing composition while said composition has moisturizing activity;
   maintaining said contact for a time period sufficient to lower the external temperature of said hot meat to about 70°–110° F. to form externally cooled meat;
   thereafter refrigerating said externally cooled meat; and
   recovering said refrigerated meat.

21. The process according to claim 20 wherein said direct current is passed through said solution until at least 50 coulombs per liter of said solution have passed therethrough.

22. The process according to claim 20 wherein said electrolyzed moisturizing composition is cooled to a frozen solid and thereafter melted, and the liquid formed from the melting of said frozen electrolyzed moisturizing composition is used to contact said hot meat.

23. The process according to claim 22 wherein said melted liquid is admixed with a non-electrolyzed aqueous solution to form an admixture having an edible chloride salt content, from said electrolyzed moisturizing composition, of at least 0.5 percent by weight.

24. The process according to claim 20 wherein said electrolyzed moisturizing composition is contacted with said meat by spraying said electrolyzed moisturizing composition onto said meat.

25. The process according to claim 20 wherein said direct current is passed through said aqueous solution at a current of about 5 to about 15 amperes.

26. The process according to claim 20 wherein said sodium chloride is present in said aqueous solution at about 0.75 to about 1.25 weight percent.

27. A process for preparing a cooked meat product having reduced shrinkage after refrigeration comprising the steps of:
   providing a plurality of hot meat cuts, each having an internal temperature of at least about 130° F.;
   providing an aqueous solution containing sodium chloride present at a concentration of at least about 0.5 percent by weight;
   passing a direct electric current of about 2 to about 20 amperes through said aqueous solution for a time sufficient to raise the pH value of said aqueous solution to from about 8.5 to about 10.5 and to pass at least about 25 coulombs per liter of said aqueous solution therethrough to produce an electrolyzed moisturizing solution;
   cooling said electrolyzed moisturizing solution to a temperature of no higher than about 30° F., after passage of said direct current has ceased, while said solution has a pH value of at least about 8, to form a frozen, solid, electrolyzed moisturizing composition;
   admixing said frozen, solid, electrolyzed moisturizing composition with a non-electrolyzed aqueous solution to form a moisturizing composition admixture having a sodium chloride content, from said electrolyzed moisturizing composition, of at least about 0.5 percent by weight, said admixture having a pH value of at least about 8;
   intermittently spraying said moisturizing composition admixture at said pH value of at least about 8 onto said plurality of hot meat cuts to contact said meat cuts with said admixture;
   maintaining said intermittent spraying for a time period sufficient to lower the external temperature of said hot meat cuts to about 70°–110° F. to form externally cooled meat;
   thereafter refrigerating said externally cooled meat; and
   recovering said refrigerated meat.

* * * * *